US009630554B1

(12) United States Patent
Whitfield

(10) Patent No.: US 9,630,554 B1
(45) Date of Patent: Apr. 25, 2017

(54) LABOR LIGHT SYSTEM

(71) Applicant: Tychicus E. Whitfield, Killeen, TX (US)

(72) Inventor: Tychicus E. Whitfield, Killeen, TX (US)

(*) Notice: Subject to any disclaimer, the term of this patent is extended or adjusted under 35 U.S.C. 154(b) by 0 days.

(21) Appl. No.: 14/992,357

(22) Filed: Jan. 11, 2016

(51) Int. Cl.
| | | |
|---|---|---|
| *F21V 19/02* | (2006.01) | |
| *F21V 21/14* | (2006.01) | |
| *F21S 8/10* | (2006.01) | |
| *F21V 21/00* | (2006.01) | |
| *B60Q 7/00* | (2006.01) | |
| *B60Q 1/00* | (2006.01) | |
| *F21V 23/00* | (2015.01) | |
| *F21V 23/02* | (2006.01) | |
| *F21V 21/088* | (2006.01) | |
| *F21V 7/04* | (2006.01) | |
| *B60Q 1/26* | (2006.01) | |
| *F21Y 101/02* | (2006.01) | |
| *F21Y 113/00* | (2016.01) | |

(52) U.S. Cl.
CPC .............. *B60Q 7/00* (2013.01); *B60Q 1/0076* (2013.01); *B60Q 1/2615* (2013.01); *F21V 7/04* (2013.01); *F21V 21/088* (2013.01); *F21V 23/003* (2013.01); *F21V 23/02* (2013.01); *F21Y 2101/02* (2013.01); *F21Y 2113/005* (2013.01)

(58) Field of Classification Search
CPC ...... B60Q 7/00; B60Q 1/0076; B60Q 1/2615; F21V 23/003; F21V 23/02; F21V 7/04; F21V 21/088; F21Y 2113/005; F21Y 2101/02

See application file for complete search history.

(56) References Cited

U.S. PATENT DOCUMENTS

| | | | | |
|---|---|---|---|---|
| 2,525,728 A | * | 10/1950 | Sauer | B60Q 7/00 116/63 P |
| 4,740,872 A | * | 4/1988 | Chou | B60Q 3/007 362/183 |
| 4,858,082 A | * | 8/1989 | Hayward | B60Q 7/00 340/471 |
| 6,556,147 B1 | * | 4/2003 | Fisher | E01F 9/617 116/63 C |
| 7,093,953 B1 | * | 8/2006 | Dicke | B60Q 7/00 340/907 |
| 9,010,953 B1 | * | 4/2015 | Wells | F21V 33/0056 362/101 |

(Continued)

*Primary Examiner* — Donald Raleigh
(74) *Attorney, Agent, or Firm* — RG Patent Consulting, LLC; Rachel Gilboy

(57) ABSTRACT

A vehicle emergency warning device has a housing including a top portion and a bottom portion; at least one clip member; and a plurality of lights. The top portion of the housing has a hollow interior; a power source attached within the interior; an on/off switch; and an electronic control circuit. The on/off switch is located on a side portion thereof and connected to the power source. The electronic control circuit is located within the interior, is electronically connected to the on/off switch, and is adapted to control a sequence of power to a plurality of lights. The at least one clip member is attached to the top portion and is adapted to removably attach the housing to a vehicle. When in use the housing member is attached to the vehicle and the plurality of lights turned on to warn others that there is an emergency situation within the vehicle.

14 Claims, 5 Drawing Sheets

(56) References Cited

U.S. PATENT DOCUMENTS

| | | | | |
|---|---|---|---|---|
| 2004/0114352 A1* | 6/2004 | Jensen | ............... | A47G 23/0309 |
| | | | | 362/101 |
| 2006/0104054 A1* | 5/2006 | Coman | ................... | E01F 9/559 |
| | | | | 362/153.1 |
| 2006/0227537 A1* | 10/2006 | Vanderschuit | ...... | F21V 33/0028 |
| | | | | 362/154 |
| 2009/0179750 A1* | 7/2009 | Jachmann | ................ | B60Q 7/00 |
| | | | | 340/473 |
| 2010/0097819 A1* | 4/2010 | Schellens | ............. | B60Q 1/2611 |
| | | | | 362/541 |
| 2010/0156326 A1* | 6/2010 | Chen | ........................ | F21S 6/001 |
| | | | | 315/313 |
| 2011/0181185 A1* | 7/2011 | Day | ..................... | B60Q 1/2615 |
| | | | | 315/77 |
| 2012/0287662 A1* | 11/2012 | Herberholt | ........... | B60Q 1/2615 |
| | | | | 362/542 |
| 2014/0104071 A1* | 4/2014 | Lo | ........................... | G09F 13/16 |
| | | | | 340/815.45 |
| 2015/0276178 A1* | 10/2015 | Chien | ..................... | F21S 8/035 |
| | | | | 362/95 |
| 2016/0090034 A1* | 3/2016 | Brown | ..................... | B60Q 1/52 |
| | | | | 340/468 |
| 2016/0186971 A1* | 6/2016 | Selevan | .................... | F21L 2/00 |
| | | | | 362/234 |

* cited by examiner

LABOR LIGHT SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of emergency lights and more specifically relates to a vehicle emergency warning device having baby blue and pink lights attached to a vehicle to warn others that there is an emergency situation within the vehicle.

2. Description of the Related Art

Childbirth is the culmination of a period of pregnancy with the expulsion of one or more newborn infants from a woman's uterus. The process of normal childbirth is categorized in three stages of labour: the shortening and dilation of the cervix, descent and birth of the infant, and the expulsion of the placenta.

There are frequent stories on the news and the Internet about babies being born while the mothers were being transported to the hospital. Luckily, the babies are usually healthy and safe, although the conditions surrounding their births may be unsanitary and dangerous for both the baby and the mother. When driving to the hospital carrying a mother about to deliver a baby, the driver is always stressed and anxious, and tempted to exceed the speed limit or to drive unsafely. Too often, they cause accidents or are stopped by the police, further delaying their arrival at the hospitals.

Various attempts have been made to solve problems found in vehicle emergency warning device art. Among these are found in: U.S. Publication No. 2013/0241725 to Ruben Cancio; U.S. Patent No. 2009/0199762 to Jacqueline Elam; U.S. Publication No. 2012/0235810 to McMeekin et al; and U.S. Pat. No. 9,159,230 to Mark Tremonti. This prior art is representative of vehicle emergency warning device. None of the above inventions and patents, taken either singly or in combination, is seen to describe the invention as claimed.

Ideally, a vehicle emergency warning device should be user-friendly and safe in-use and, yet may operate reliably and be manufactured at a modest expense. Thus, a need exists for a vehicle emergency warning device having baby blue and pink lights attached to a vehicle to warn others that there is an emergency situation within the vehicle and to avoid the above mentioned problems.

BRIEF SUMMARY OF THE INVENTION

In view of the foregoing disadvantages inherent in the known emergency lights art, the present invention provides a vehicle emergency warning device. The general purpose of the present invention, which will be described subsequently in greater detail is to provide a vehicle emergency warning device having baby blue and pink lights attached to a vehicle to warn others that there is an emergency situation within the vehicle.

A vehicle emergency warning device comprising a housing including a top portion and a bottom portion; at least one clip member; and a plurality of lights. The top portion of the housing has a hollow interior; a power source attached within the interior; an on/off switch; and an electronic control circuit. The on/off switch is located on a side portion thereof and connected to the power source. The electronic control circuit is located within the interior, is electronically connected to the on/off switch, and is adapted to control a sequence of power to a plurality of lights. The housing includes a unique serial number to thereby identify the vehicle emergency warning device if used during the commission of a crime. The at least one clip member is attached to said top portion and is adapted to removably attach said housing to a vehicle. The at least one clip member comprises two clip members spaced apart from one another and attached to a top surface of the top portion.

The bottom portion including a front wall, a back wall, side walls, and bottom wall. The front wall, back wall, side walls, and bottom wall are formed from a transparent material. The bottom portion is removably attached to the top portion. The front wall, back wall, side walls, and bottom wall define an interior volume. The vehicle emergency warning device further comprising a shield member attached within the interior volume of the bottom portion and is adapted to reflect the light of the plurality of lights in predetermined directions.

The plurality of lights are removably attached to the top portion, are adapted to be electronically connected to the power source through the electronic control circuit and on/off switch, and are adapted to extend into the interior volume of the bottom portion. When in use the housing member can be attached to the vehicle and the plurality of lights turned on to warn others that there is an emergency situation within the vehicle. The plurality of lights are formed as LED lights. The plurality of lights include two different colors. The two different colors of the plurality of lights are chosen from a group of colors consisting of red, blue, pink, and white.

The present invention holds significant improvements and serves as a vehicle emergency warning device. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention vehicle emergency warning device (entitled Labor Light System) constructed and operative according to the teachings of the present invention.

The various embodiments of the present invention will hereinafter be described in conjunction with the appended drawings, wherein like designations denote like elements

DETAILED DESCRIPTION

As discussed above, embodiments of the present invention relate to emergency lights devices and more particularly to a vehicle emergency warning device (entitled Labor Light System) having baby blue and pink lights attached to a vehicle to warn others that there is an emergency situation within the vehicle.

Generally speaking, the Labor Light System is designed to provide drivers transporting pregnant women to hospitals, with a way to let other drivers and the police know the nature of their emergencies. When other drivers or the police see the flashing light blue and pink lights, they will be able to offer assistance with getting the driver to the hospital quicker or to help deliver the baby if the driver has parked and is attempting to deliver the baby without assistance. This light fixture has several pink and blue LED lights that will flash on and off. It has clips, so it can be fitted over the vehicle's rearview mirror inside the vehicle. When it is powered on, the flashing lights will be seen by drivers passing by as well as in the rearview mirrors of drivers in front of the vehicle carrying the pregnant woman.

A built-in shield causes the light to be reflected forward, so it will not interfere with the driver's ability to see the road ahead. It can also be clipped onto the inside of the window, just so other drivers passing will see the flashing lights or see the lights flashing in their rearview mirrors. Each unit sold will have a unique serial number, so the Labor Light System may be traced and identified if it is used during the commission of a crime.

Figure 1:
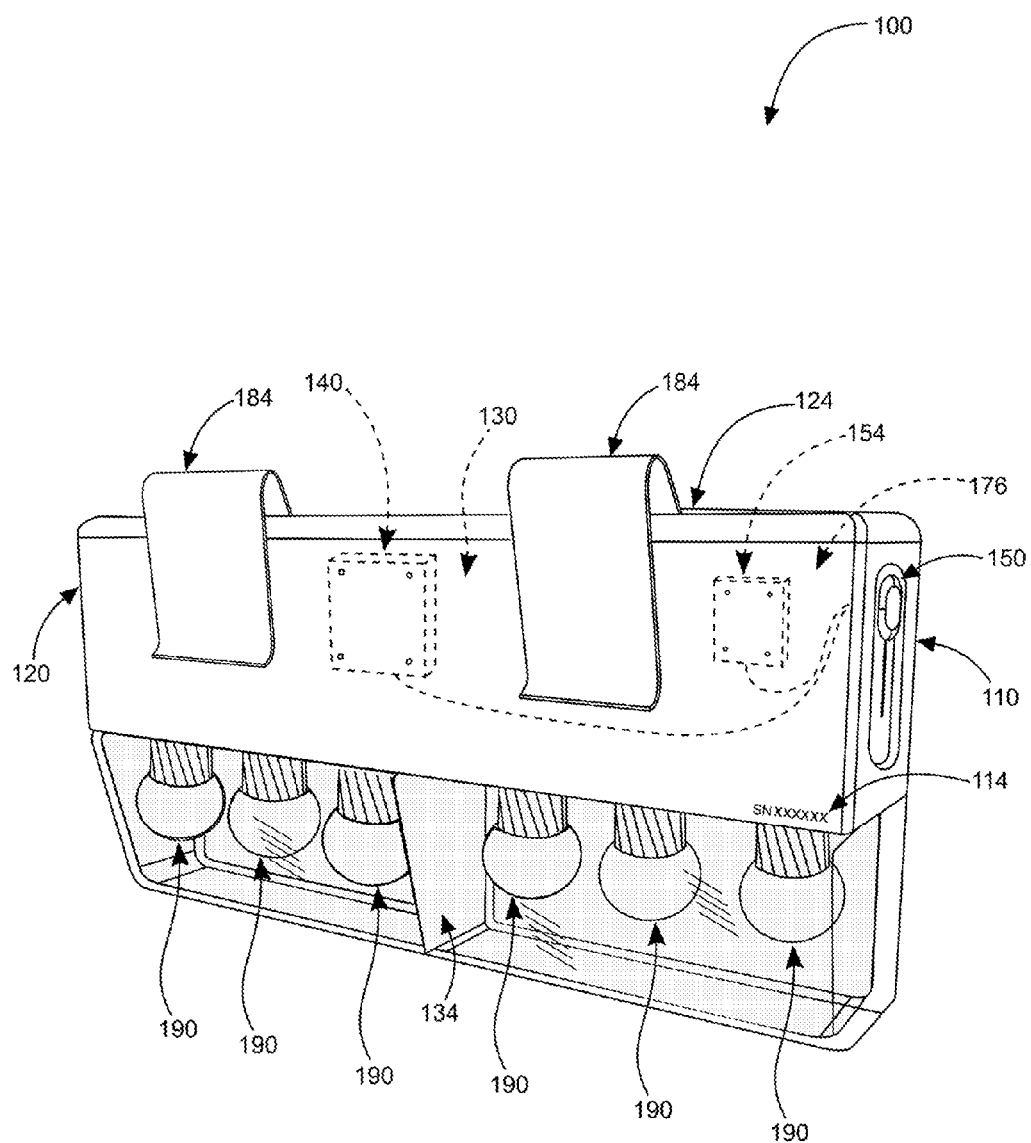
FIG. 1 shows a front perspective view illustrating a vehicle emergency warning device according to an embodiment of the present invention.
Figure 2:
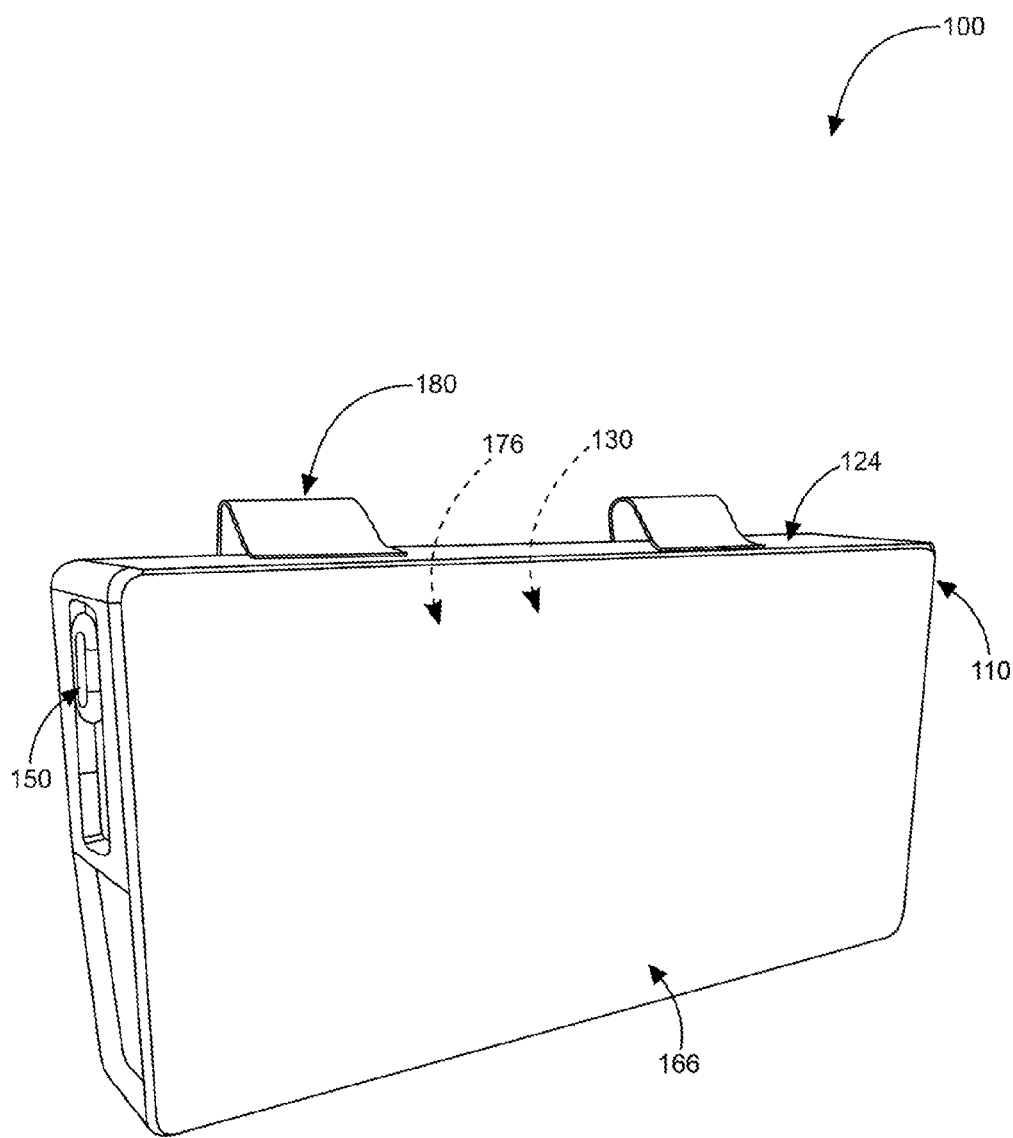
FIG. 2 shows a front perspective view illustrating a top portion of a housing of the vehicle emergency warning device according to an embodiment of the present invention.
Figure 3:
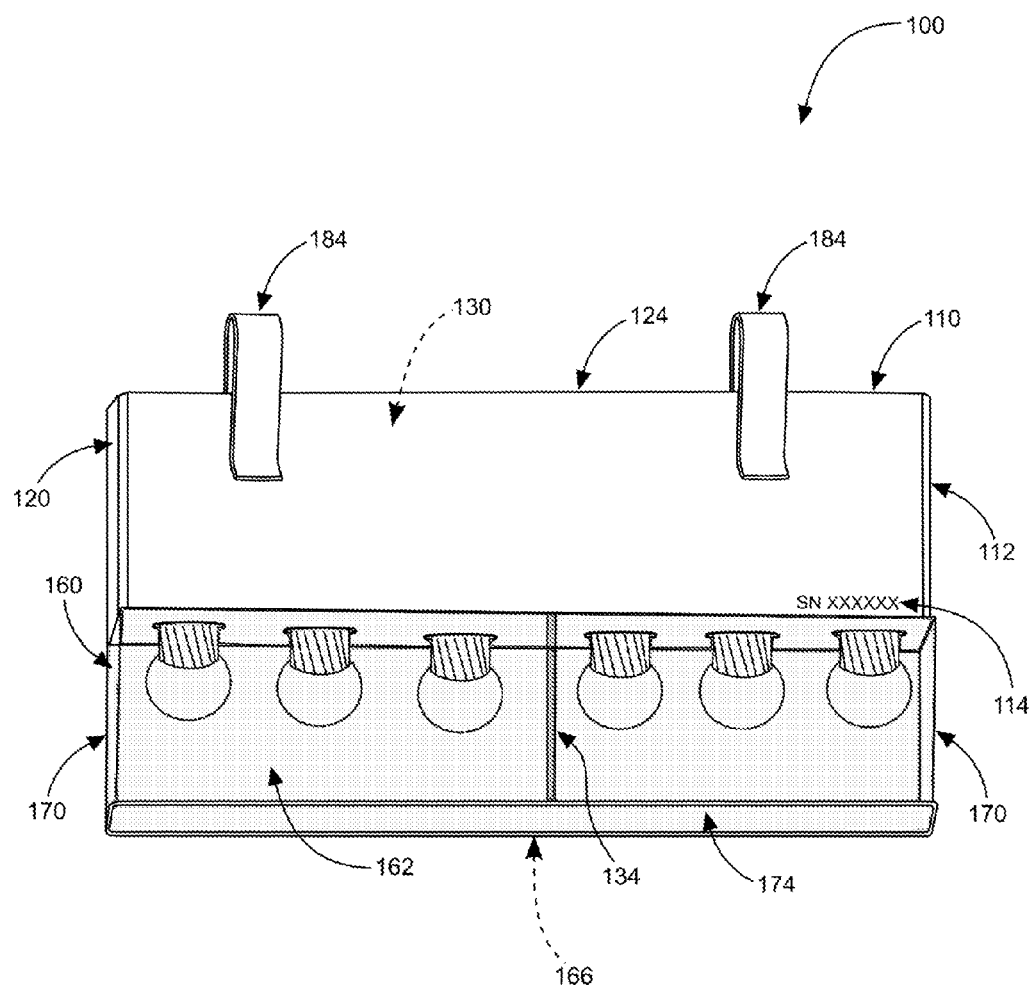
FIG. 3 is a perspective view illustrating a bottom portion of the housing having two clip members of the vehicle emergency warning device according to an embodiment of the present invention

The unique features of this product will provide the following benefits for consumers everywhere:

A warning light to let other drivers and the police know that the vehicle is transporting a woman about to deliver a baby It attaches with clips over the rearview mirror, so it will not swing or fall while the vehicle is being driven Will notify other drivers on the road, so they can get out of the way and allow the vehicle to get to the hospital Police will be less likely to stop the vehicle for reckless driving and may also help to clear the route to the hospital When a vehicle is stopped with flashing pink and blue lights, those who can provide assistance may be willing to stop and help deliver the baby A warning light that may help to prevent accidents, drivers being arrested, and mother being further delayed when they need to be allowed to get to the hospital Referring now to the drawings by numerals of reference there is shown in FIGS. 1-3 perspective views illustrating vehicle emergency warning device 100 according to an embodiment of the present invention.

Vehicle emergency warning device 100 comprising housing 110 including top portion 120 and bottom portion 160; at least one clip member 180; and plurality of lights 190. Top portion 120 of housing has hollow interior 130; power source 140 attached within interior 130; on/off switch 150; and electronic control circuit 154. On/off switch 150 is located on side portion 112 of housing 110 and connected to power source 140. Electronic control circuit 154 is located within interior 130, is electronically connected to on/off switch 150, and is adapted to control a sequence of power to plurality of lights 190. Housing 110 includes unique serial number 114 to thereby identify vehicle emergency warning device 100 if used during the commission of a crime. At least one clip member 180 is attached to top portion 120 and is adapted to removably attach housing 110 to vehicle 410. At least one clip member 180 comprises two clip members 182 spaced apart from one another and attached to top surface 124 of top portion 120.

Bottom portion 160 including front wall 162, back wall 166, side walls 170, and bottom wall 174. Front wall 162, back wall 166, side walls 170, and bottom wall 174 are formed from a transparent material. Bottom portion 160 is removably attached to top portion 120. Front wall 162, back wall 166, side walls 170, and bottom wall 174 define interior volume 176. Vehicle emergency warning device 100 further comprising shield member 134 attached within interior volume 130 of bottom portion 160 and is adapted to reflect the light of plurality of lights 190 in predetermined directions.

Plurality of lights 190 are removably attached to top portion 120, are adapted to be electronically connected to power source 140 through electronic control circuit 154 and on/off switch 150, and are adapted to extend into interior volume 176 of bottom portion 160. When in use housing member 110 can be attached to vehicle 410 and plurality of lights 190 turned on to warn others that there is an emergency situation within vehicle 410. Plurality of lights 190 are formed as LED lights. The plurality of lights include two different colors. The two different colors of plurality of lights 190 are chosen from a group of colors consisting of red, blue, pink, and white.

Figure 4:
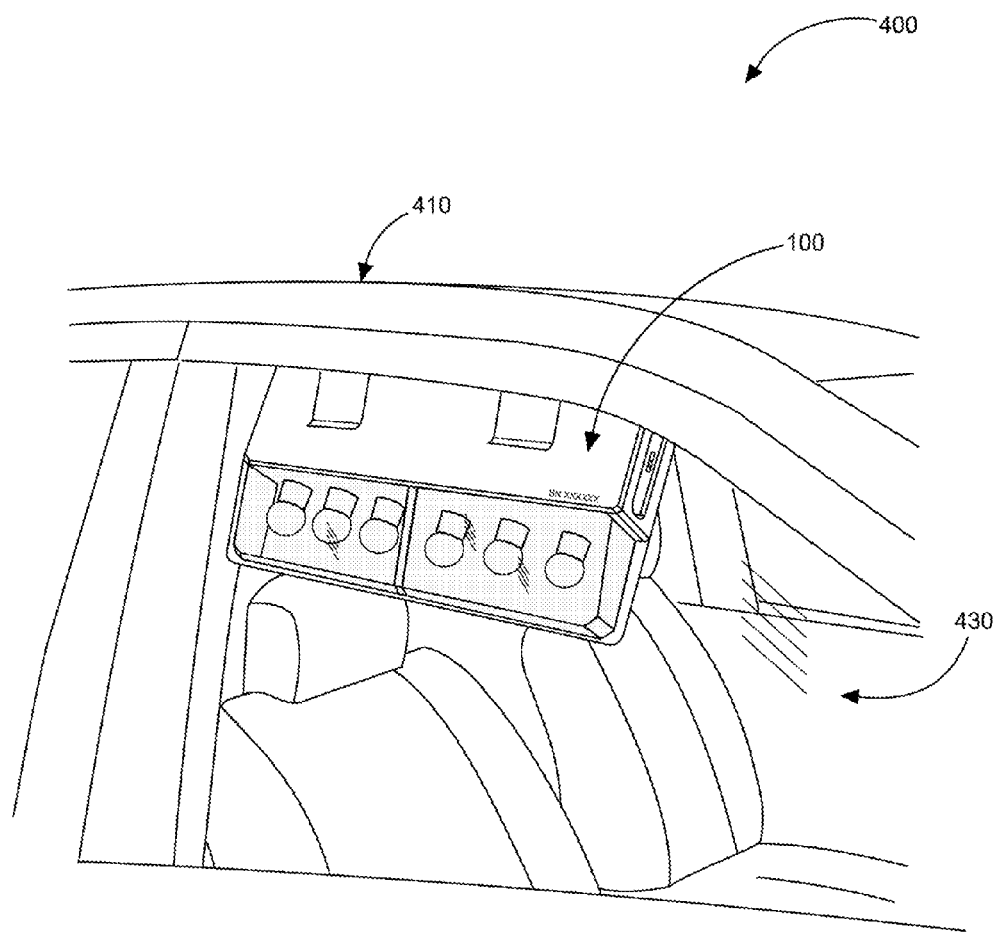
FIG. 4 is a perspective view illustrating a combination of a vehicle and a vehicle emergency warning device according to an embodiment of the present invention.
Figure 5:
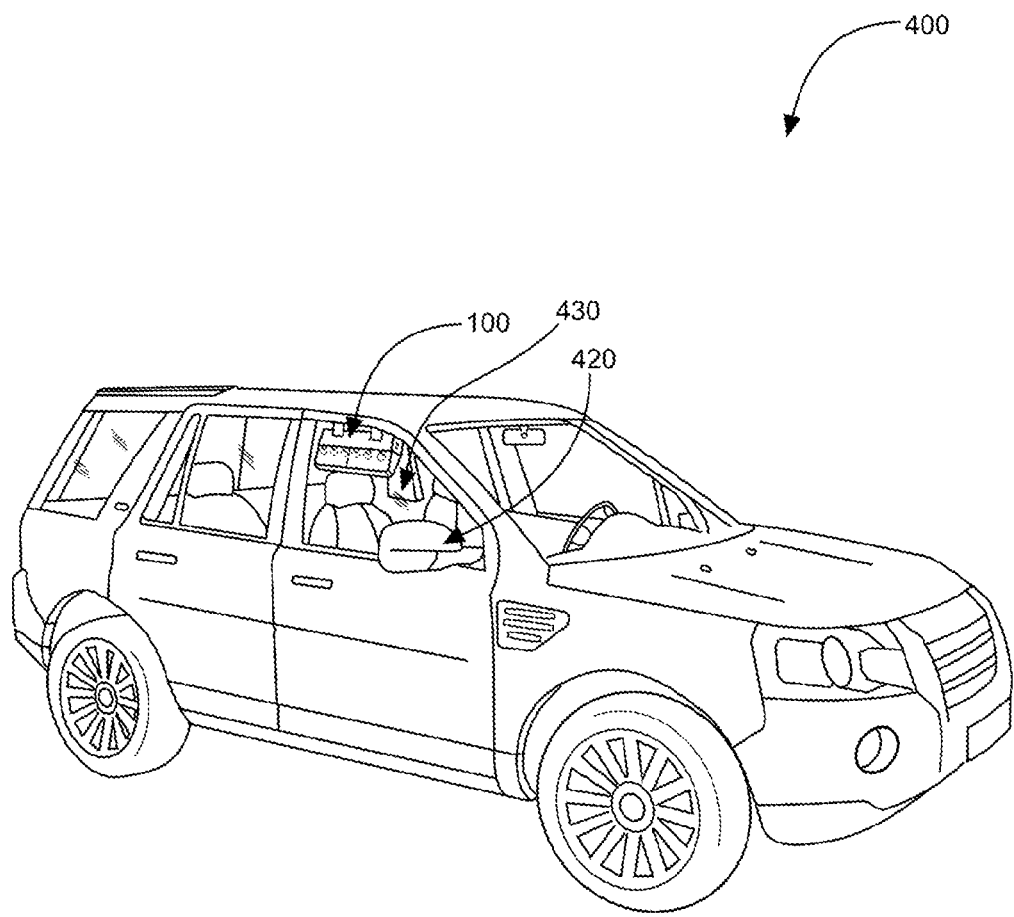
FIG. 5 is a perspective view illustrating a combination of a vehicle and a vehicle emergency warning device according to an embodiment of the present invention.

Referring now to FIGS. 4-5 showing perspective views illustrating combination of a vehicle and a vehicle emergency warning device 400 according to an embodiment of the present invention.

Combination of a vehicle and a vehicle emergency warning device 400 comprising: vehicle 410 including: rear view mirror 420 and at least one movable window 430; housing 110 including top portion 120 and bottom portion 160; at least one clip member 180; and plurality of lights 190. Top portion 120 of housing has hollow interior 130; power source 140 attached within interior 130; on/off switch 150; and electronic control circuit 154. On/off switch 150 is located on side portion 112 of housing 110 and connected to power source 140. Electronic control circuit 154 is located within interior 130, is electronically connected to on/off switch 150, and is adapted to control a sequence of power to plurality of lights 190. Housing 110 includes unique serial number 114 to thereby identify vehicle emergency warning device 100 if used during the commission of a crime. At least one clip member 180 is attached to top portion 120 and is adapted to removably attach housing 110 to vehicle 102. At least one clip member 180 comprises two clip members 182 spaced apart from one another and attached to top surface 124 of top portion 120. When in use housing member 110 can be attached to vehicle 410 and plurality of lights 190 turned on to warn others that there is an emergency situation within vehicle 102. Plurality of lights 190 are formed as LED lights. The plurality of lights include two different colors. The two different colors of plurality of lights 190 are chosen from a group of colors consisting of red, blue, pink, and white.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A vehicle emergency warning device comprising:
    a housing including;
        a top portion including;
            a hollow interior;
            a power source attached within said interior;
            an on/off switch;
                wherein said on/off switch is located on a side portion thereof and connected to said power source; and
            an electronic control circuit;
                wherein said electronic control circuit is located within said interior, is electronically connected to said on/off switch, and is adapted to control a sequence of power to a plurality of lights;
        a bottom portion including;
            a front wall, a back wall, side walls, and bottom wall;
                wherein said front wall, back wall, side walls, and bottom wall are formed from a transparent material;
                wherein said bottom portion is removably attached to said top portion;
                wherein said front wall, back wall, side walls, and bottom wall define an interior volume;
    at least one clip member;
        wherein said at least one clip member is attached to said top portion and is adapted to removably attach said housing to a vehicle; and
    a plurality of lights;
        wherein said plurality of lights are removably attached to said top portion, are adapted to be electronically connected to said power source through said electronic control circuit and on/off switch, and are adapted to extend into said interior volume of said bottom portion;
        wherein when in use said housing member can be attached to said vehicle and said plurality of lights turned on to warn others that there is an emergency situation within said vehicle.
2. The vehicle emergency warning device of claim 1, wherein said plurality of lights are formed as LED lights.
3. The vehicle emergency warning device of claim 1, wherein said plurality of lights include two different colors.
4. The vehicle emergency warning device of claim 3, wherein said two different colors of said plurality of lights are chosen from a group of colors consisting of red, blue, pink, and white.
5. The vehicle emergency warning device of claim 1, wherein said at least one clip member comprises two clip members spaced apart from one another and attached to a top surface of said top portion.
6. The vehicle emergency warning device of claim 1, further comprising a shield member attached within said interior volume of said bottom portion and is adapted to reflect the light of said plurality of lights in predetermined directions.
7. The vehicle emergency warning device of claim 1, wherein said housing includes a unique serial number to thereby identify said vehicle emergency warning device if used during the commission of a crime.
8. A combination of a vehicle and a vehicle emergency warning device, said combination comprising:
    A vehicle including;
        a rear view mirror; and
        at least one movable window; and
    a housing including;
        a top portion including;
            a hollow interior;
            a power source attached within said interior;
            an on/off switch;
                wherein said on/off switch is located on a side portion thereof and connected to said power source; and
            an electronic control circuit;
                wherein said electronic control circuit is located within said interior, is electronically connected to said on/off switch, and is adapted to control a sequence of power to a plurality of lights;
        a bottom portion including;
            a front wall, a back wall, side walls, and bottom wall;
                wherein said front wall, back wall, side walls, and bottom wall are formed from a transparent material;
                wherein said bottom portion is removably attached to said top portion;
                wherein said front wall, back wall, side walls, and bottom wall define an interior volume;
    at least one clip member;
        wherein said at least one clip member is attached to said top portion and is adapted to removably attach said housing to either one of said vehicle rear view mirror and said at least one movable window; and
    a plurality of lights;
        wherein said plurality of lights are removably attached to said top portion, are adapted to be electronically connected to said power source through said electronic control circuit and on/off switch, and are adapted to extend into said interior volume of said bottom portion;
        wherein when in use said housing member can be attached to said vehicle and said plurality of lights turned on to warn others that there is an emergency situation within said vehicle.
9. The combination of claim 8, wherein said plurality of lights are formed as LED lights.
10. The combination of claim 8, wherein said plurality of lights include two different colors.

11. The combination of claim 10, wherein said two different colors of said plurality of lights are chosen from a group of colors consisting of red, blue, pink, and white.

12. The combination of claim 8, wherein said at least one clip member comprises two clip members spaced apart from one another and attached to a top surface of said top portion.

13. The combination of claim 8, further comprising a shield member attached within said interior volume of said bottom portion and is adapted to reflect the light of said plurality of lights in predetermined directions.

14. The combination of claim 8, wherein said housing includes a unique serial number to thereby identify said vehicle emergency warning device if used during the commission of a crime.

* * * * *